Oct. 9, 1962  W. PUFFE ETAL  3,057,587
ARRESTING GEAR WITH BRAKING DEVICE FOR AIRCRAFT
Filed Sept. 10, 1959  5 Sheets-Sheet 3
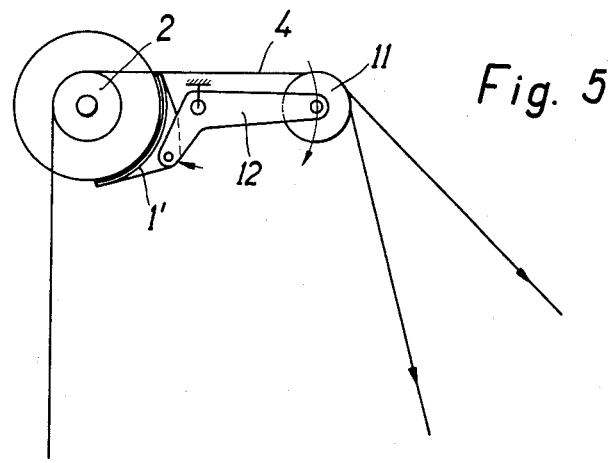
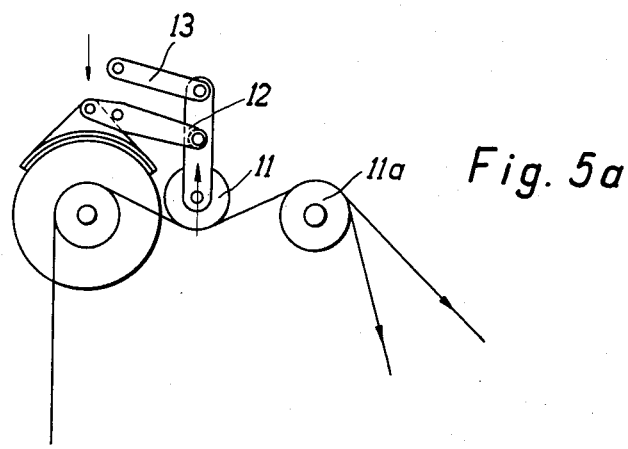
Inventors
WERNER PUFFE,
THEODOR GEORGI
by Mestern & Kollin
ATTORNEYS

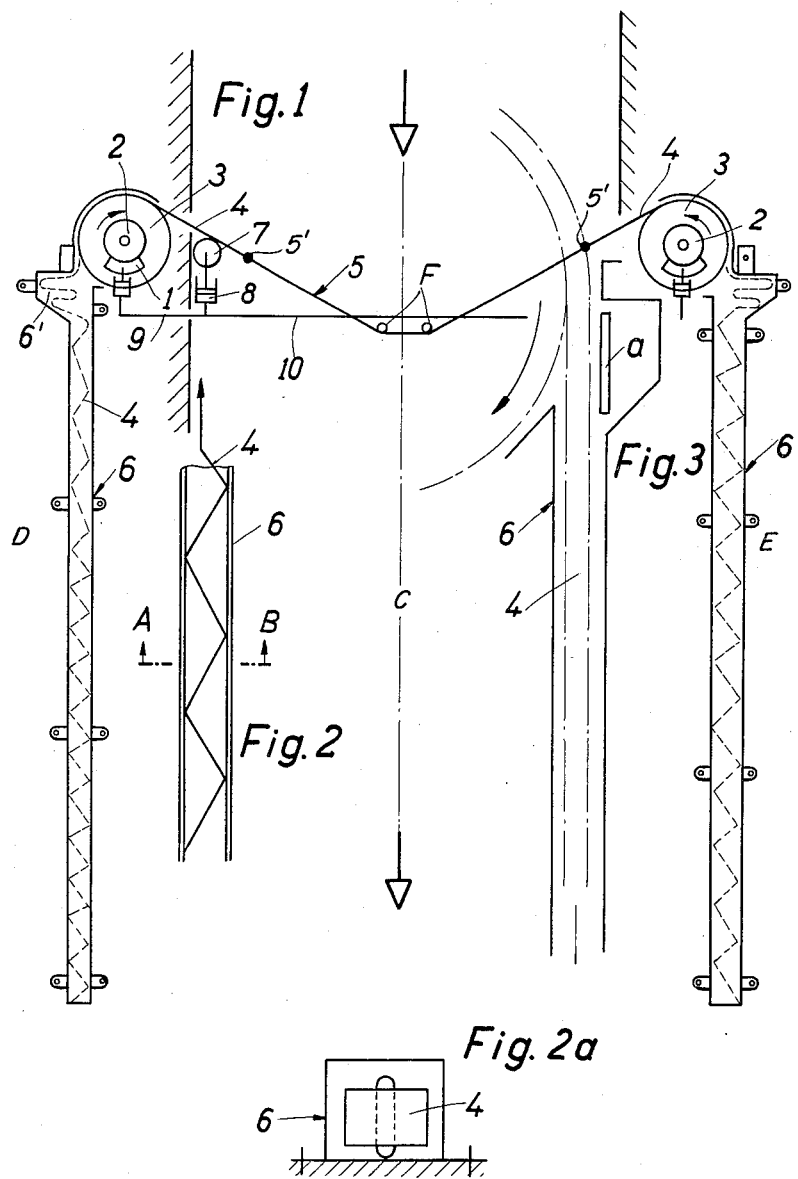

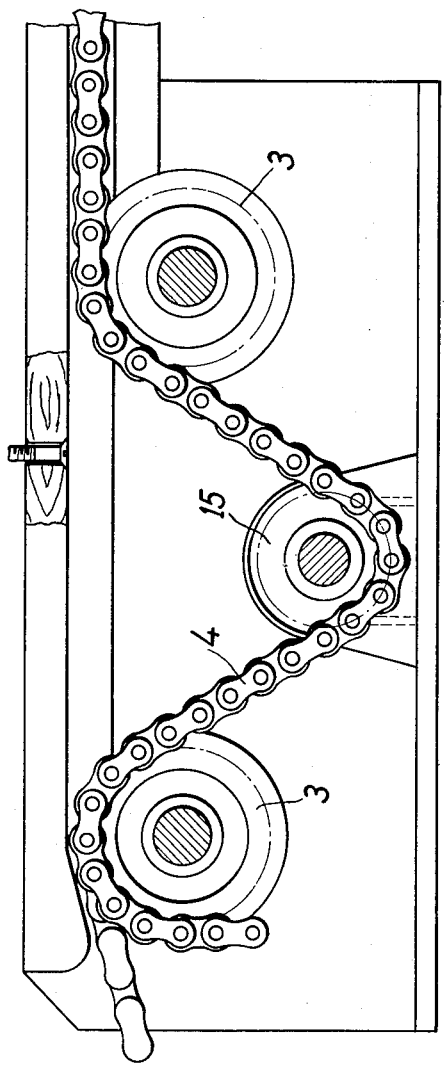

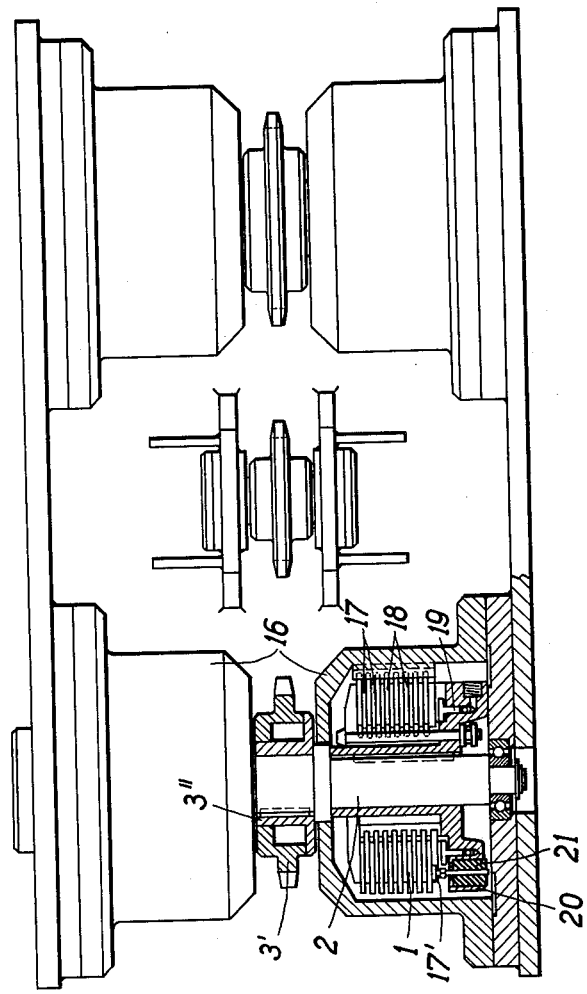

3,057,587
ARRESTING GEAR WITH BRAKING DEVICE FOR AIRCRAFT

Werner Puffe, Dusseldorf, and Theodor Georgi, Hilden, Rhineland, Germany, assignors to Hein, Lehmann & Co. Aktiengesellschaft, Dusseldorf, Germany
Filed Sept. 10, 1959, Ser. No. 839,228
Claims priority, application Germany Feb. 12, 1959
9 Claims. (Cl. 244—110)

This invention relates to an arresting gear for aircraft, provided with a braking device acting on either end of an arresting wire stretched across the runway.

There are known braking devices for this purpose wherein hydraulic brake cylinders are arranged above or beneath the runway, the brake pistons being subjected to fluid pressure controllable by means of a hydraulic pump, which pressure normally tends to hold the brake piston in neutral position, but, when an aircraft encounters the arresting wire or net, applies an appropriate braking action to the piston as it is advanced by the resulting cable tension. As soon as the aircraft has been brought to a stop and the net or wire has been released again, the fluid, under the influence of the continuously operating hydraulic pump, forces the piston back into neutral position, at the same time likewise restoring the arresting gear to normal operative position by means of the cable. However, a brake and arresting gear of this type involves relatively complicated design, especially as to its hydraulic system, since the latter requires a pump effecting continuous circulation of hydraulic medium.

Another known feature of arresting gears equipped with hydraulic brake systems is a brake cylinder built like a pipe filled with stationary fluid and provided with several brake pistons in series, having overflow valve orifices becoming progressively smaller in approach direction, so that the several pistons become operative successively, piling up close upon the other as the line arresting the aircraft becomes taut. Such a brake system likewise requires comparatively elaborate equipment because it involves a plurality of successively operative brake pistons.

Hitherto known braking devices provide for the piston connected to the cable to be decelerated during its advance by operation of a compressed gas in the brake cylinder, via combustion elements provided in the wall of the cylinder, which may be energized from a control station. The combustion elements may be energized either simultaneously or successively to obtain more satisfactory braking action. However, such braking devices are comparatively liable to operating trouble, and require replacement of combustion elements before re-use. Besides, the controls for firing the combustion elements are necessarily rather elaborate.

Hydraulic brake systems have likewise been proposed in which there is no special pump for the hydraulic medium, and which may be adapted with relative ease to existing braking requirements. In these, the medium-filled cylinder containing the piston has an axially directed throttling slit or equivalently arranged orifices for the medium displaced during the motion of the piston. Parallel to the brake cylinder, an overflow cylinder connected to it by way of the throttling slit or orifices is provided, which latter cylinder, in the case of a slit, becomes smaller in the direction of the cable acting on the brake piston, or normally in flight direction. The effective area of the slit or orifices may be varied by means of a hinged sliding flap provided with suitably arranged orifices, thus controlling the brake action.

Finally, there are known brake devices for aircraft arresting gears in which the arresting net is attached at either end to a wire rope wound on a drum. The drums are set up to right and left of the runway and connected to a friction brake by a shaft. Such braking devices, owing to their large mass and diameter, have considerable inertia. This is highly undesirable because a large force is required to start the drums, with resulting violent concussion because of the short starting time available, and frequently results in damage. To avoid these disadvantages, accelerator mechanisms have been developed, but these have failed of adoption because they are very complicated and costly in construction.

The object of the invention is to provide a braking device for aircraft arresting gears that as characterized by extremely simple and reliable construction, does not require special accelerators, and may be readily adaptable to particular braking requirements. Furthermore, the new braking device should be easily transportable, and capable of installation either above or below grade. This object is achieved according to the invention by provision of a braking device which comprises a roller chain attached to the arresting wire and traveling over at least one sprocket wheel subject to brake action. The sprocket wheel may preferably be mounted on a shaft cooperating with brake shoes or disks capable of being more or less firmly applied. The sprocket wheel itself should preferably be of shock-absorbing design, its sprocketed periphery being flexibly united to the hub by means of springs or the like.

The roller chain, according to another feature of the invention, is accommodated, at its end remote from the arresting wire, in a magazine in which the links of the chain rest zig-zag fashion upon each other, and which, at the end towards the sprocket wheel, has an enlargement in which the roller chain is able to form one or more bights. During the braking operation, the roller chain is drawn out of the magazine, housed above or below grade, its accommodation in the magazine as aforementioned serving to avoid severe concussions, particularly at the commencement of the braking operation, since there can only be a gradual increase in the weight of chain participating in the brake action at a given time.

To retract the roller chain, the sprocket wheel is actuated manually or mechanically, a guide rail vertically displaceable in the enlargement of the magazine serving to feed the roller chain evenly into the magazine during the retracting operation.

According to another feature of the invention, the sprocket-wheel brake shoes or disks are actuated via hydraulic or mechanical control means by the aircraft itself, the roller chain being passed over an idler which actuates the sprocket-wheel brake in accordance with the tension of the roller chain. These hydraulic or mechanical control means are so arranged that even if the aircraft encounters the arresting wire off-center, the sprocket-wheel brakes will always act simultaneously and with equal force. For this purpose, equalizing lines or connecting rods are provided transversely to the runway between the hydraulic lines or linkages, as the case may be, of the brake installations arranged on either side of the runway.

By means of the features of the invention, a mechanical braking device for aircraft is provided which affords extremely simple and dependable construction, while being capable of optimum adaptation to particular braking requirements. An additional advantage is that the roller chain can be retracted, or replaced in the magazine, with comparative rapidity, in any case much faster than is possible in the case of known brake drums and hydraulic braking devices.

The device according to the invention will now be more fully described with reference to the accompanying drawings, but it should be understood that these are given by way of illustration and not of limitation and that many changes in the details may be made without departing from the spirit of the invention.

In the drawing:

FIG. 1 is a diagrammatic plan view of an embodiment of the improved braking device;

FIG. 2 is a diagrammatic view, drawn to enlarged scale, of the magazine of FIG. 1 with its roller chain inside;

FIG. 2a is a cross-sectional view taken along the line IIa—IIa of FIG. 2;

Fig. 3 is an enlarged detail view of a portion of FIG. 1 showing how the roller chain is guided between the sprocket wheel and the open end of the magazine by the vertically displaceable guide rail;

FIGS. 5 and 5a show two embodiments of a mechanical control system for the sprocket-wheel brakes; and FIGS. 6 and 7 are, respectively, horizontal and vertical cross-sectional views of a braking device for continuous operation, equipped with two sprocket-wheel brakes that may be set or released at will.

Figure 4:
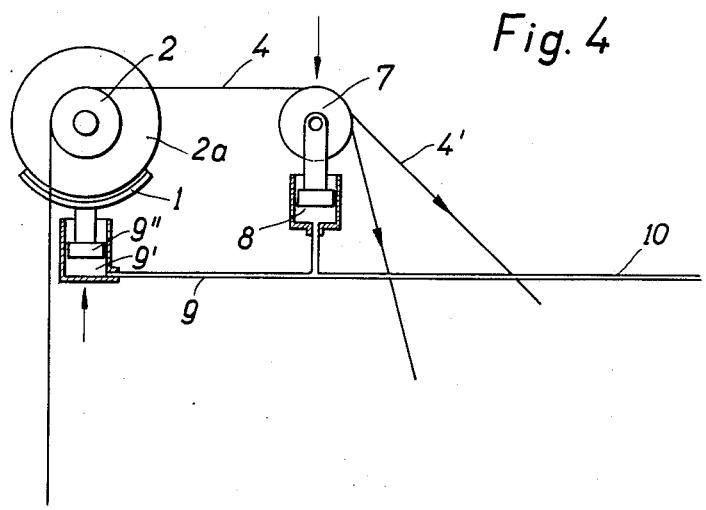
FIGS. 4 and 4a show two embodiments of a hydraulic control system for the sprocket-wheel brakes.

Referring to FIG. 1, a respective braking device D, E is provided on each side of the runway C, and comprises a friction brake 1, shaft 2 and sprocket wheel 3 mounted thereon, with a roller chain 4 passing over the latter while being attached to the arresting wire 5 at 5'. Each roller chain 4 is received and accommodated in a magazine 6, installed either above or below grade. In this magazine, the individual links of the roller chain 4 are stacked zig-zag fashion, as schematically illustrated in FIG. 2. At the open end towards the sprocket wheel 3, the magazine 6 is provided with an enlargement 6' in which the roller chain can form one or more bights. In this enlargement, a vertically displaceable guide rail $a$ is provided; this rail is retractable downwardly, and hence is inoperative, while the roller chain 4 is being withdrawn from the magazine. While the chain 4 is being retracted, however, the guide rail $a$ projects upwardly, thereby insuring that the roller chain 4 will feed uniformly into the magazine 6. The drive for retracting the roller chain 4 is likewise provided by sprocket wheel 3, which may be suitably actuated for this purpose manually or mechanically by way of shaft 2 in a manner not shown.

The roller chain 4 at each longitudinal edge of the runway C has its free extremity received in the respective magazine 6 and is never entirely withdrawn therefrom. In the erect position of guide elements $a$, the enlargement 6', at the end of each magazine adjacent its sprocket wheel 3, is constricted so that the chain, having a natural stiffness in longitudinal direction, is fed directly into the main portion of the magazine. When the chain strikes the bottom of this magazine, it begins to fold accordion-fashion and continues to fold in this manner as long as additional chain is fed into the magazine and until it is filled. Upon filling of the main body portion of the magazine 6, the guide element $a$ is retracted to permit the formation of bights in the enlargement 6' of each magazine. The guide element is maintained in its retracted position during the feeding out of the chain upon engagement of the flexible member 5 with an aircraft.

Figure 4A:
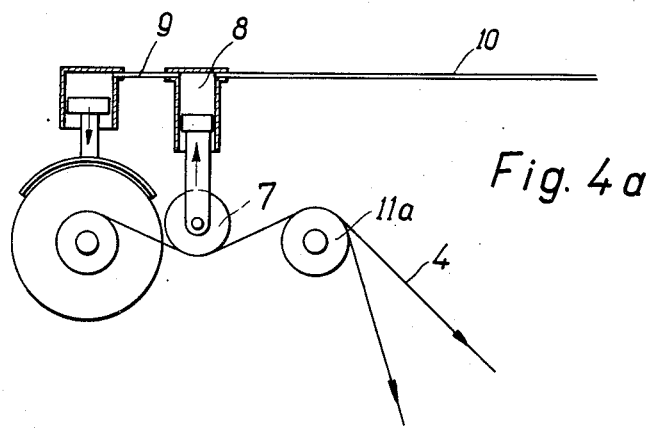

To control the brakes 1, according to the embodiments illustrated in FIGS. 4 to 5a, an idler 7 is provided, in contact with the roller chain 4, and, depending on the tension in the chain, applies the brakes 1 more or less firmly against the sprocket-wheel shaft 2 or brake drum 2a mounted thereon by way of hydraulic or mechanical control means. In the hydraulic control illustrated in FIGS. 4 and 4a, the idler 7 is attached to a piston 8 controlling the brake cylinder 9', or its piston 9'', by way of a hydraulic line 9. While in the case of FIG. 4 the idler 7 responds directly to the instantaneous deflection of the arresting wire 5 or adjoining portion 4' of the roller chain, in the case of FIG. 4a an extra reversing roller 11a is provided. Between the hydraulic lines 9 of the brake installations on the two sides of the runway, an equalizing line 10 is provided to ensure that the hydraulic brake pressure in the two installations will always be the same regardless of the point at which the aircraft encounters the arresting wire 5 which extends transversely to the runway.

In the mechanical control system for the brake 1 illustrated in FIGS. 5 and 5a the idler 11 in contact with the roller chain 4 is connected to the brake shoe 1' by means of a bell crank 12. At the same time, as illustrated in FIG. 5a, a parallel linkage for idler 11 may be provided in the form of an auxiliary lever 13, which affords a means of attaching a connecting rod, not shown; the latter like the equalizing line 10 in FIGS. 4 and 4a leads to the corresponding lever of the other brake installation on the opposite side of the runway.

When the aircraft F to be arrested encounters the wire rope 5, the two roller chains 4 are drawn up, set in motion, and gradually withdrawn from magazine 6. Under the influence of the tension in chain 4, idler 7 or 11 is carried along, actuating the hydraulic piston 8 or the lever 12 and hence the brake 1. The pilot piston 8 is preferably so proportioned to the piston 9'' provided in the brake cylinder 9' that the magnitude of the brake force will be adapted to the type of aircraft in question, or in fact be automatically determined by the latter. The roller chains 4 are fed back, as aforementioned, by a disengageable gear motor or detachable hand crank. Before starting the motor, the guide rail $a$ is brought into operative position, as previously described, in which it permits the chain to feed evenly into the magazine 6.

In the braking device illustrated in FIGS. 6 and 7, the roller chain 4 passes over two sprocket wheels 3 and an interposed reversing wheel 15. Each of the two sprocket wheels 3 is provided with its own friction brake 1, capable of being applied or released at will, received in brake housings 16 and consisting of two disk brakes arranged on either side of the corresponding sprocket wheel 3. The shafts 2, having double bearings in the said housings, are provided with disks 17 axially displaceable but not rotatable upon them, which disks cooperate with disks 18 set in the inner wall of the housing 16. They can be axially applied more or less firmly by means of the annular piston 19. To return the annular piston 19 to neutral position, restoring-spring members in the form of rubber pads 21 are provided between the cup 20 attached to shaft 2 and the lowermost brake disk 17'. The sprocket wheels mounted on shaft 2 are of shock-absorbing design, their sprocket portion 3' being united with the hub 3'' by means of springs or the like flexible members. The aforementioned double brake system is especially suitable for continuous operation because it is possible in this way to apply or release one or the other brake at will as required.

What we claim is:

1. A mechanism for arresting aircraft, comprising an elongated flexible member adapted to extend transversely across a runway, a pair of roller chains each having a free extremity while being secured to said member at a respective location remote from its free extremity for displacement of said chains upon engagement of said member by an aircraft traversing said runway, a respective sprocket wheel engaging each of said chains for rotation thereby, support means for said sprocket wheel, and control means on said support means for braking the rotation of said sprocket wheel, thereby regulating the deceleration of said aircraft.

2. A mechanism for arresting aircraft, comprising an elongated flexible member adapted to extend transversely across a runway, a respective elongated magazine adjacent opposite longitudinal edges of said runway, a respective roller chain having a free extremity received in each of said magazines while being secured to said member at a respective location remote from its free extremity for displacement of said chains out of said magazines upon engagement of said member by an aircraft traversing said runway, a respective sprocket wheel engaging each of said chains for rotation thereby, and control means for braking the rotation of said sprocket wheel, thereby regulating the deceleration of said aircraft.

3. A mechanism for arresting aircraft, comprising an elongated flexible member adapted to extend transversely across a runway, a respective elongated magazine adjacent opposite longitudinal edges of said runway, a respective roller chain having a free extremity received in each of said magazines while being secured to said member at a respective location remote from its free extremity for displacement of said chains out of said magazines upon engagement of said member by an aircraft traversing said runway, a respective sprocket wheel engaging each of said chains for rotation thereby, said magazines each having an enlarged portion adjacent a corresponding one of said sprocket wheels for feeding a respective chain thereto, control means for braking the rotation of said sprocket wheel, thereby regulating the deceleration of said aircraft, and retractable guide means at said enlarged portion for constricting it upon feeding of said chain accordion-fashion into said magazine.

4. A mechanism for arresting aircraft, comprising an elongated flexible member adapted to extend transversely across a runway, a pair of roller chains each having a free extremity while being secured to said member at a respective location remote from its free extremity for displacement of said chains upon engagement of said member by an aircraft traversing said runway, a respective sprocket wheel engaging said chains for rotation thereby, respective support means for each of said sprocket wheels, and control means on said support means for braking the rotation of said sprocket wheels, thereby regulating the deceleration of said aircraft, said control means including brake means engageable with said sprocket wheel and regulating means operable by said aircraft for controlling said brake means.

5. A mechanism according to claim 4 wherein said regulating means includes an idler wheel engaging at least one of said chains intermediate said location and said sprocket wheel and coupling means operatively connecting said idler wheel to said brake means.

6. A mechanism according to claim 5 wherein said coupling means includes at least one mechanical link between said idler wheel and said brake means.

7. A mechanism according to claim 5 wherein said brake means includes a main hydraulic actuating cylinder, said regulating means including a hydraulic pilot cylinder operatively connected to said idler wheel, said coupling means comprising a fluid coupling between said cylinders.

8. A mechanism according to claim 4, further comprising a shaft journaled in said support means, and flexible mounting means connecting one of said sprocket wheels to said shaft.

9. A mechanism according to claim 4, further comprising a shaft secured to one of said sprocket wheels, said brake means including a plurality of axially shiftable first disks keyed to said shaft, a housing surrounding said disks, a plurality of axially shiftable second disks keyed to said housing and interleaved with said first disks, hydraulic piston means for urging said disks axially into frictional interengagement, and restoring spring means bearing upon said piston for urging it into a neutral position.

References Cited in the file of this patent

UNITED STATES PATENTS

| | | |
|---|---|---|
| 842,248 | Rockwell | Jan. 29, 1907 |
| 1,297,264 | Simms | Mar. 11, 1919 |
| 1,789,653 | Hoyt | Jan. 20, 1931 |
| 2,483,655 | Schultz | Oct. 4, 1949 |
| 2,789,780 | Cotton et al. | Apr. 23, 1957 |

FOREIGN PATENTS

| | | |
|---|---|---|
| 569,149 | Great Britain | May 7, 1945 |
| 529,660 | Italy | June 24, 1955 |